A. E. PREYER.
TIRE AND METHOD OF CONSTRUCTING THE SAME.
APPLICATION FILED AUG. 2, 1919.
1,373,094.  Patented Mar. 29, 1921.
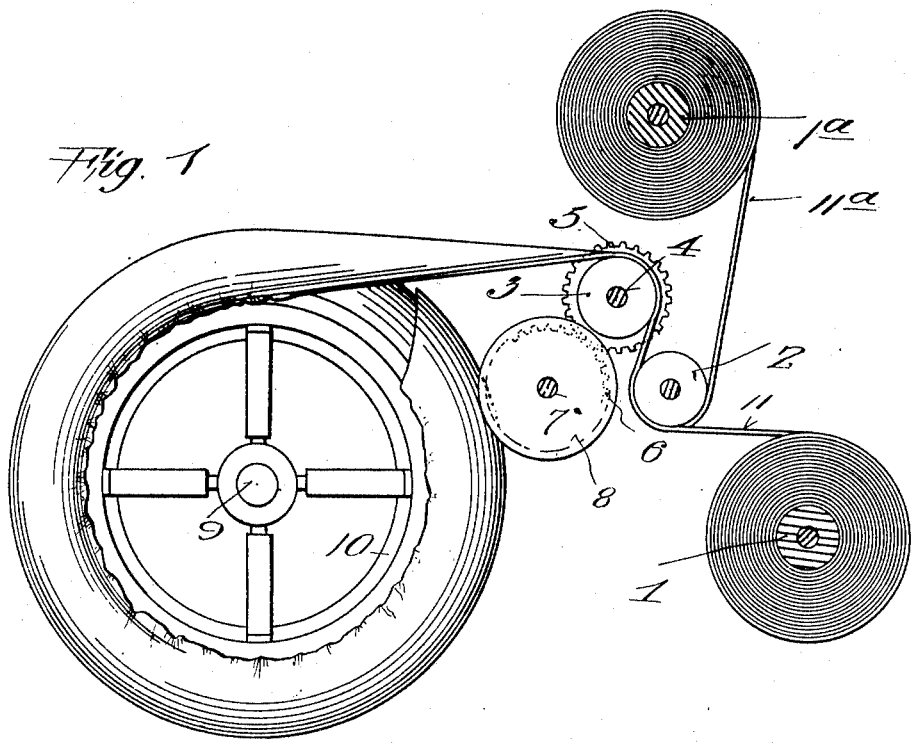
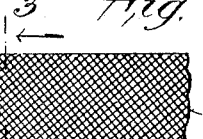
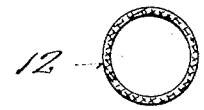
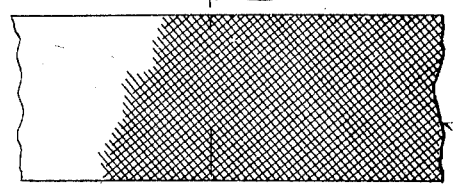
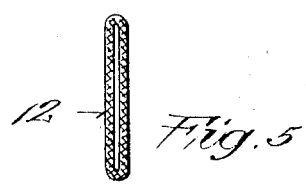
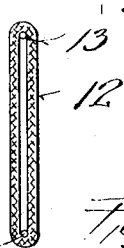

UNITED STATES PATENT OFFICE.

ARTHUR E. PREYER, OF NEW YORK, N. Y.

TIRE AND METHOD OF CONSTRUCTING THE SAME.

1,373,094.     Specification of Letters Patent.     Patented Mar. 29, 1921.

Application filed August 2, 1919. Serial No. 314,866.

*To all whom it may concern:*

Be it known that I, ARTHUR E. PREYER, a citizen of the United States, residing at New York, county and State of New York, have made a certain new and useful Invention in Tires and Methods of Constructing the Same, of which the following is a specification.

This invention relates to the method of constructing tires, especially such as are known as the shoes for pneumatic tire units as are commonly employed in the automobile industry.

The object of the invention is to provide a simple and efficient method of construction of tires whereby the strains to which the shoe is subjected are evenly distributed to the fabric of the completed shoe.

A further object of the invention is to provide a shoe wherein a continuous strip of material is employed in building up the carcass thereof, thereby making it necessary to have but two ends of the material.

A further object of the invention is to provide a shoe for pneumatic tires wherein uncut fabric is employed, eliminating broken threads at the sides of the shoe structure.

Further objects of the invention will appear more fully hereinafter.

The invention consists substantially in the construction, combination, location, and relative arrangement of parts, and the method employed in the construction of the completed shoe, all as will be more fully hereinafter set forth, as shown by the accompanying drawing, and finally pointed out in the appended claims.

Referring to the drawings:—

Figure 1 illustrates the stretching of a ply of fabric on the form or core in accordance with my invention.

Fig. 2 illustrates a portion of the fabric employed in accordance with my invention.

Fig. 3 is a sectional view taken on the line 3, 3, Fig. 2, looking in the direction of the arrows.

Fig. 4 is a view similar to Fig. 2 after the fabric has been flattened.

Fig. 5 is a sectional view taken on the line 5, 5, Fig. 4, looking in the direction of the arrows.

Fig. 6 is a view similar to Fig. 5, showing a slightly modified construction.

The same part is designated by the same reference character wherever the same occurs throughout the several views.

In the manufacture of shoes, particularly that part called the carcass, the usual method employed is to take flat strips of fabric or canvas which have been cut on the bias from a long length of woven canvas or fabric into suitable strips of equal width and to temporarily fasten the end of one strip to the end of the next strip and wind the same up on suitable rolls and then build up the carcass on a form or mold and overlapping the ends of the respective strips and build up in this manner layer upon layer of the carcass structure until the required thickness or strength is obtained. It will be understood that with this arrangement the strain that is imposed upon the carcass is only taken up to the end or side of each individual piece of material, that is, on each of the strips employed, and, where these strips join each other a materially weakened point in the shoe structure is obtained, because the strain can not be transmitted continuously and throughout the length of each individual strip. The severed edges of the woof materially weaken the fabricated structure, and, in addition, the side edges of the strips are loose, capable of unraveling and weakened because of the short severed ends of the various threads of the fabric weave. It is among the special purposes of my present invention to avoid these and other difficulties by employing a fabric without cut or severed edges, thus allowing the fabric to transmit continuously the strain which is imposed thereon without weakness at any particular spot throughout its width and length, and to apply the fabric in a continuous manner to prevent overlapping ends of the strips and the resultant weakness at that portion of the shoe, or, in other words, to employ a continuous strip of fabric, unraveled at any portion thereof, with only two ends to the fabricated structure, namely, the beginning and end of the single strip of fabric.

In carrying out my invention, and referring to Figs. 2, 3, 4 and 5, I employ a fabric which is woven in the usual well known manner, into tubular form and of any desired length. The tubular fabric is then flattened out as indicated in Figs. 4 and 5, and in its flattened condition is rolled upon rolls 1. The roll 1 is fed in the usual manner over idler 2, pulley 3, mounted on a shaft 4, with gear 5 driven from any suitable source of power to rotate the pulley 3 and gear 6 mounted on the shaft 7 on which is likewise mounted friction pulley 8 so that upon rotation of either shaft 4, 7, or of the shaft 9 of the form or core 10 the fabric indicated at 11 will unwind from the roll 1 and be fed onto the form or core 10 which is similarly rotated. The core 10 is of the usual form, and is illustrated as for pneumatic tires for automobiles. The tube of woven material which is illustrated at 12 in its flattened condition is of such width as to completely form the carcass over the core 10.

It will thus be seen that I avoid the severed edges of strips of the canvas or fabric cut on a bias, and I am enabled to obtain a continuous strip equivalent to two ply, whereas by the methods heretofore employed discontinuous strips or temporarily joined strips of one ply are fed onto the core. It will be understood that the parts of Fig. 1 are rotated in the usual manner to build up the carcass to any desired degree so that in the methods heretofore employed for each revolution of the core one ply is obtained, whereas, according to my invention, for each revolution of the core two ply is obtained. If desired, and as shown, additional rolls 1ª may be employed feeding the flattened tubular fabric 11ª simultaneously with the fabric 11 from the roll 1, so that upon each revolution of the core a four ply carcass may be obtained.

It is customary in the construction of shoes to have the strands, threads, cords, or whatever material is employed to make up the fabric strips treated or solutionized with a suitable rubber solution, and in accordance with my invention this can be done at any time prior to or during the construction of the carcass. The woven tubular fabric may be treated, the flattened fabric may be treated, the fabric may be treated on the core, or the treatment may taken place between the layers of the fabric, and in this respect my invention is not to be limited or restricted.

Further, I do not desire to be limited or restricted to any particular material or fabric employed as any material capable of being woven into tubular form may be employed. If desired, small tubular cords, threads, or the like, may be employed for this purpose, flattened out either before or after being woven into place. To make a bead, the bead may be formed in the usual well known manner by means of disks or rollers such as are commonly employed in the art. I provide means, however, to form a bead on the edges of the tire. I show in Fig. 6 one form wherein I insert between the folds of the material 12 a wire or wires indicated generally at 13 during the construction of the flattened material, which wires are positioned at the edge of the carcass approximately where the place that the bending of the carcass takes place. With this construction a bead is obtained, and an endless wire formed ring is secured for this purpose. When the carcass has thus been constructed the rubber tread is applied to it in the usual well known manner, which detail forms no part of my present invention.

Many modifications and changes in detail will readily occur to those skilled in the art without departing from the spirit and scope of my invention as defined in the claims, therefore having set forth the objects and nature thereof, what I claim as new and useful and of my own invention and desire to secure by Letters Patent, is,—

1. The method of making tire carcasses which consists in forming a tubular fabric, then flattening the tubular fabric and finally winding the flattened tubular fabric circumferentially about a tire form.

2. The method of making tire carcasses which consists in forming a tubular fabric, then flattening the tubular fabric and finally winding the flattened tubular fabric about a tire-form.

3. The method of making tire carcasses which consists in forming a tubular fabric, then flattening the tubular fabric and finally winding the flattened tubular fabric circumferentially about a tire-form in successive layers to obtain the required thickness.

4. A tire carcass comprising a flattened tubular fabric and wound circumferentially around a tire core or form.

5. A tire carcass comprising an unbroken or uncut tubular fabric flattened out to form a flat strip wound circumferentially upon itself in successive layers to the required thickness to conform in shape with the tire-form.

In testimony whereof I have hereunto set my hand on this 28th day of July, A. D. 1919.

ARTHUR E. PREYER.